(12) United States Patent
Silverstein et al.

(10) Patent No.: US 12,253,971 B1
(45) Date of Patent: Mar. 18, 2025

(54) CONTEXTUALIZATION OF DIGITAL CONTENT

(71) Applicant: INTERNATIONAL BUSINESS MACHINES CORPORATION, Armonk, NY (US)

(72) Inventors: Zachary A. Silverstein, Georgetown, TX (US); Logan Bailey, Atlanta, GA (US); Jeremy R. Fox, Georgetown, TX (US); Melanie Dauber, Oceanside, NY (US); Jacob Ryan Jepperson, St. Paul, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 42 days.

(21) Appl. No.: 18/492,236

(22) Filed: Oct. 23, 2023

(51) Int. Cl.
*G06F 16/14* (2019.01)
*G06F 16/36* (2019.01)

(52) U.S. Cl.
CPC .......... *G06F 16/144* (2019.01); *G06F 16/367* (2019.01)

(58) Field of Classification Search
CPC .............................. G06F 16/144; G06F 16/367
See application file for complete search history.

(56) References Cited

U.S. PATENT DOCUMENTS

| | | | |
|---|---|---|---|
| 7,313,766 B2 | 12/2007 | Kautto Kiovula et al. | |
| 8,600,173 B2 | 12/2013 | Esposito et al. | |
| 9,509,838 B2 | 11/2016 | Leeds et al. | |
| 10,528,700 B2 | 1/2020 | Thomsen et al. | |
| 11,227,240 B2 | 1/2022 | Cohen et al. | |
| 2014/0129942 A1* | 5/2014 | Rathod | H04N 21/44226 715/720 |
| 2015/0339034 A1* | 11/2015 | Garcia | G06F 40/169 715/738 |

(Continued)

FOREIGN PATENT DOCUMENTS

CA      2552365 C     7/2014

OTHER PUBLICATIONS

Huang, J., et al., "Growing on steroids: rapidly scaling the user base of digital ventures through digital innovation", MIS Quarterly, 41 (1), 2017, 15 pgs.

(Continued)

*Primary Examiner* — Angelica Ruiz
(74) *Attorney, Agent, or Firm* — Aaron Pontikos, Esq.; Matthew M. Hulihan, Esq.; Heslin Rothenberg Farley & Mesiti P.C.

(57) ABSTRACT

Contextualization of digital content includes generating a corpus of metadata associated with a user, including technical information about devices and applications that execute on the devices, and interaction data describing usage of the devices and applications that execute on the devices, orienting the metadata to ontological elements, monitoring user consumption of digital content on the device and identifying content elements, comparing the identified content elements to the ontological elements, identifying a target content element to contextualize for the user with selected metadata of the corpus, and modifying the digital content for graphical presentation to the user, the modifying providing added information, associated with the target content element, in the digital content, the added information including the selected metadata of the corpus.

20 Claims, 9 Drawing Sheets

(56) References Cited

U.S. PATENT DOCUMENTS

2020/0356595 A1* 11/2020 Kim .................... G06F 16/9038
2020/0401935 A1* 12/2020 Malhotra ................. G06N 5/04
2022/0083926 A1    3/2022 Miller et al.

OTHER PUBLICATIONS

Santos, P., "Applications Across Co-Located Devices Studying a Framework-Driven Design Approach", Nova University Lisbon, 2021, 295 pgs.
Beheshti, A., et al., "Towards Cognitive Recommender Systems", MDPI, Algorithms, 2020, 27 pgs.
Zimmermann, A., "An Architecture for Contextualized Learning Experiences", Sixth IEEE International Conference on Advanced Learning Technologies (ICALT'06). IEEE, 2006, 5 pgs.
"IBM Watson Natural Language Understanding", retrieved on Aug. 14, 2023 from Internet URL: <https://www.ibm.com/cloud/watson-natural-language-understanding>, 11 pgs.

* cited by examiner

CONTEXTUALIZATION OF DIGITAL CONTENT

BACKGROUND

It is common for individuals to consume content, for instance digital articles, technical specifications, and other information, that include technical information of varying detail. This is particularly true when the content deals with a ubiquitous topic like the latest smartphone technology. As an example, a consumer interested in researching and potentially purchasing a newly-released smartphone offered by a particular device maker might search for articles that discuss the new smartphone. The consumer might inevitably encounter articles that set forth various technical specifications of the product regardless whether the consumer has a desire for such details or whether the consumer understands such details.

SUMMARY

Content, especially content with technical information, can be difficult for a reader to digest. Beyond reading complexity, which could be a factor in understanding the content, the reader may not be as deep in the content and technical details as the authors of that content. For instance, a technical article about how smartphone battery charging can be low energy and only require 15 watts of power has no context to a user who does not track watt consumption on smartphones or comparable devices. The meaning and implications of this technical information may be lost on the user, and can lead to the user missing out on key details and engagement with the content that the user consumes.

Shortcomings of the prior art are overcome and additional advantages are provided through the provision of a computer-implemented method. The method generates a corpus of metadata associated with a user. The metadata includes technical information about devices associated with the user and applications that execute on the devices, and interaction data describing usage of devices and applications that execute on the devices. The method also orients the metadata to ontological elements, including keywords and concepts. The orienting includes relating items of the metadata to externally-available information to identify at least some of the ontological elements. Additionally, the method monitors, by software executing on a device used by the user, user consumption of digital content on the device and identifies content elements of the digital content. The user consumption includes loading the digital content for graphical presentation to the user. The method also compares the identified content elements to the ontological elements to which the metadata is oriented, and identifies, based on the comparing, a target content element, of the identified content elements, to contextualize for the user with selected metadata of the corpus. Further, the method modifies the digital content for graphical presentation to the user. The modifying provides added information, associated with the target content element, in the digital content, the added information including the selected metadata of the corpus.

Additional aspects of the present disclosure are directed to systems and computer program products configured to perform the methods described above and herein. The present summary is not intended to illustrate each aspect of, every implementation of, and/or every embodiment of the present disclosure. Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Described herein are approaches for contextualization of digital content through modification of the content. Contextualization can help address and overcome issues surrounding the conveyance of content with technical specifications and details that may otherwise be lost on individuals consuming the content. One challenge lies in finding an approach that can personalize content for the user and provide the user with relevant information through context and relevancy flags.

Provided herein are aspects to help personalize content for a user as the user consumes the content, and based on identifying relationships with the information being presented. This can help the user better understand the content and provide the user a more meaningful interaction with the content. Aspects can capture and contextualize text embedded specifications and details based on a corpus of metadata associated with the user, and with which the user can be expected to have some familiarity. This enables tailoring the content being consumed to the user and providing the user with a more comprehensive understanding of the material with which the user engages. Thus, in embodiments, aspects capture and contextualize text-embedded specifications and details based on an information corpus generated at least in part from metadata of a user's known, metrically commensurable devices. This aspect uses a corpus of metadata with metrics and sizing around the user's assets. It modifies (replaces, augments, supplements, etc.) digital content being consumed when it detects specifications or descriptions in that digital content that could benefit from metrically-comparable information in the corpus. Aspects can filter specific, relative information based on the recency of the used asset. For instance, if the user owns and uses version 13 of a smartphone offered by Company A, and previously owned and used version 12 of the smartphone, then a comparable description of the screen size of the newly-released version 15 of that smartphone could be given in the context of the user's most-recently used version 13, rather than the previously used version 12. In other examples, information about the version 12 product may be useful for comparison to the newly-released version 15.

Similarly, aspects can filter specific, relative information by weighing data relevancy based on the user's contextual familiarity and nearest commensurable asset/device. If reading an article with embedded descriptive language related to energy consumption of a smartwatch, aspects might appropriately weight comparison information about other handheld or mobile devices with which the user is relatively more familiar higher than information about energy consumption of the user's home air conditioning unit, as an example.

Figure 1:
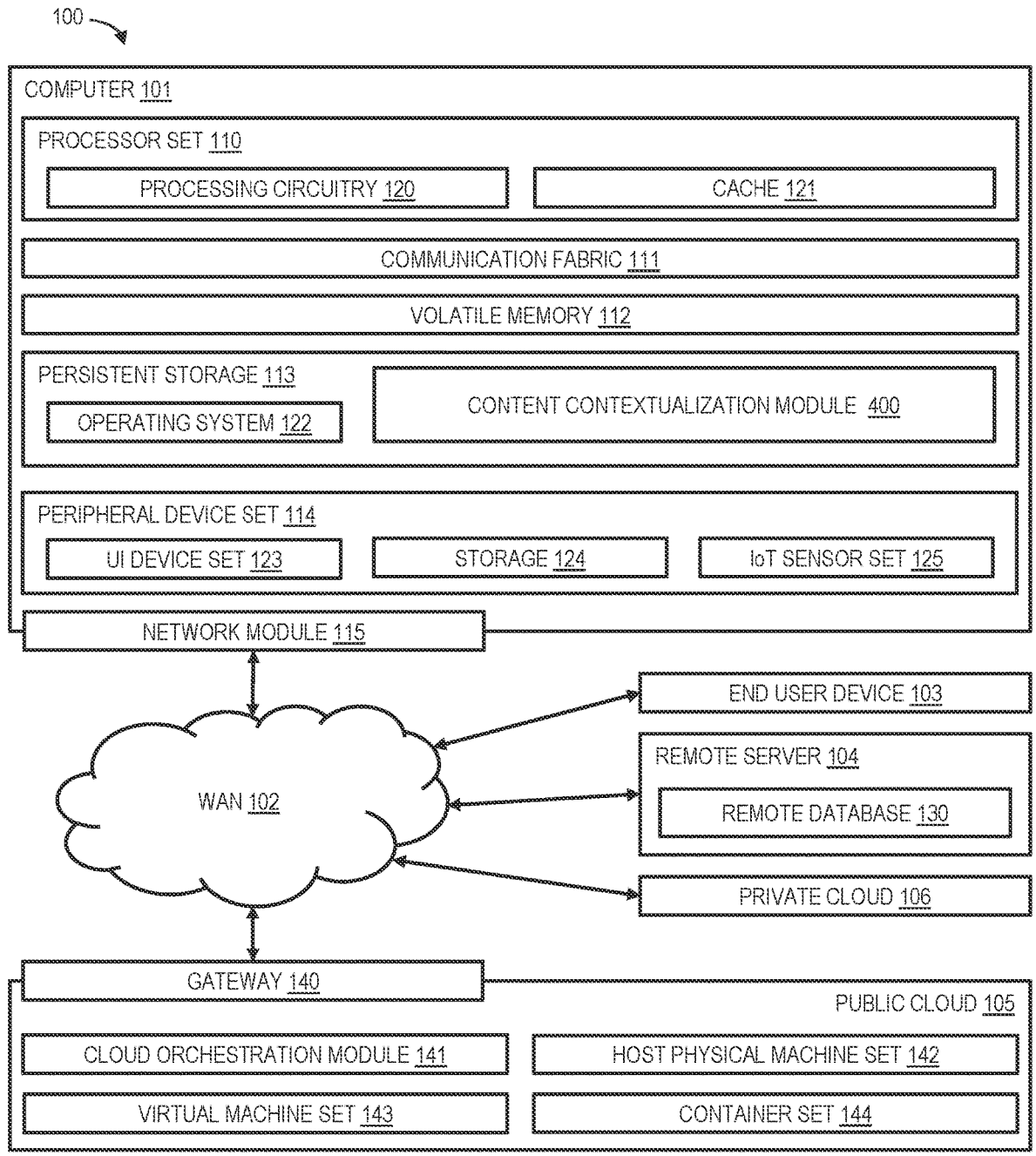
FIG. 1 depicts an example computing environment to incorporate and/or use aspects described herein.

One or more embodiments described herein may be incorporated in, performed by and/or used by a computing environment, such as computing environment 100 of FIG. 1. As examples, a computing environment may be of various architecture(s) and of various type(s), including, but not limited to: personal computing, client-server, distributed, virtual, emulated, partitioned, non-partitioned, cloud-based, quantum, grid, time-sharing, cluster, peer-to-peer, mobile, having one node or multiple nodes, having one processor or multiple processors, and/or any other type of environment and/or configuration, etc. that is capable of executing process(es) that perform any combination of one or more aspects described herein. Therefore, aspects described and claimed herein are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing aspects of the present disclosure, such as code of content contextualization module 400. In addition to block 400, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 400, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the disclosed methods"). These computer readable program instructions are stored in various types of computer readable storage media, such as cache 121 and the other storage media discussed below. The program instructions, and associated data, are accessed by processor set 110 to control and direct performance of the disclosed methods. In computing environment 100, at least some of the instructions for performing the disclosed methods may be stored in block 400 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 400 typically includes at least some of the computer code involved in performing the disclosed methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the disclosed methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above in FIG. 1 is only one example of a computing environment to incorporate, perform, and/or use aspect(s) of the present disclosure. Other examples are possible. For instance, in one or more embodiments, one or more of the components/modules of FIG. 1 are not included in the computing environment and/or are not used for one or more aspects of the present disclosure. Further, in one or more embodiments, additional and/or other components/modules may be used. Other variations are possible.

Figure 2:
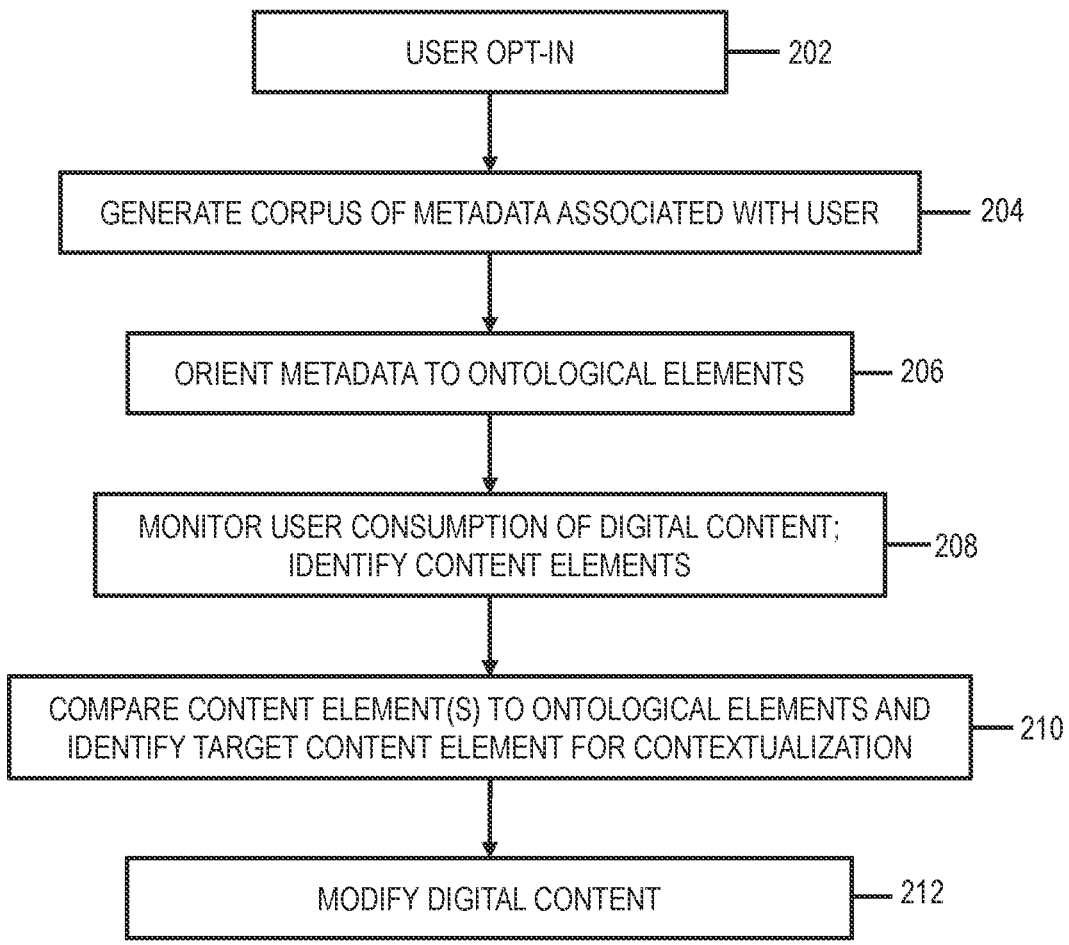
FIG. 2 depicts an example process for content contextualization, in accordance with aspects described herein.

Aspects will be described in conjunction with FIG. 2, depicting an example process for content contextualization in accordance with aspects described herein. Some or all of aspects of FIG. 2 could be performed automatically by, via, or in conjunction with, software executing on one or more computer systems.

The process of FIG. 2 begins with user opt-in (202). Opt-in includes, for example, opt-in and access/permissions grant to a software module for monitoring user consumption of digital content, for instance monitoring consumption via a web browser, an e-commerce application, or other commercial medium. In general, the opt-in can allow monitoring of any facility by which the user consumes content that is intended to be a candidate for modification. The opt-in can also grant permission to capture a corpus of relevant metadata associated with the user, as described herein.

Continuing with FIG. 2, the process generates (204) a corpus of metadata associated with a user. The metadata can include various items of information that may be useful in contextualizing content that the user might consume in the future. Example metadata includes technical information about devices associated with the user and about applications that execute on the devices. Additional example metadata includes interaction data that describes usage of a set of those and/or other devices, and applications that execute on that set of devices. This aspect is directed to establishing an initial baseline from which contextualization of other content can stem. For instance, the corpus can inform of information, metrics, technical details, etc. with which the user could be considered to be familiar on account that they are derived from user activity and devices associated with that user. If the user uses version 13 of a given smartphone and it is observed that the user frequently uses the navigation application native to that smartphone, certain assumptions or conclusions can be made from that information. For instance, it might be concluded that the user is at least familiar with the size of the display provided on that version 13 smartphone, how long it takes to charge the smartphone, and features of that navigation application, as examples. Sources of information from which to generate the corpus of metadata include, but are not limited to, the devices a user possesses, technical information about such devices, information about applications executing on those devices, including data exhaust associated with use of those applications, data produced by the applications or metadata about application usage, metrics, such as how fast they run, battery/energy consumption, memory usage, and usage patterns, etc. Some or all of this information could be obtained from the devices themselves, for instance application and system logs, and other data maintained on, or provided by, the devices. Additionally, in some embodiments metadata can be pulled-in from one or more connected corpuses, such a catalog of technical specifications about devices or a corpus of crowdsourced information.

The process of FIG. 2 continues by orienting (206) the metadata to ontological elements. Ontological elements can include any elements of one or more ontologies, for instance keywords and concepts of the one or more ontologies. One aspect of this orienting is to associate the metadata with ontological elements that make sense. Part of this might be collecting elements/keywords/concepts within the metadata itself, for instance technical specification(s) of one or more devices, like the model of the user's smartphone device itself and the version of the operating system currently-installed thereon. Not only might the version number and commercial name of the operating system be an ontological element identified in the metadata, but other characteristics of the operating system, for instance that it is a Unix-based operating system, might be identified and inform ontological elements, for instance the keyword 'UNIX'. As part of this orienting, the process could relate items of the metadata of the corpus to externally-available information to identify at least some of those ontological elements. This aspect could pull some information from other sources to help understand more about the corpus of metadata. In this manner, the orienting can serve to enhance the ability to define (or further refine) the context of the device(s), application data/metadata, etc. that went into the initial generation of the corpus, enriching that data to further establish the baseline from which to stem contextualization of later-encountered content.

In some embodiments, the orienting uses a discovery tool to perform the relating of item(s) of the metadata of the corpus to externally-available information. The discovery tool could be an artificial intelligence model configured and trained to look for relevant keywords in the corpus and find associated external commercial data, such as technical specifications or anything pertinent to a piece of hardware or software, a commercial ontology, or a relationship with the keywords. In this manner, the discovery tool can search for externally-available commercial data, ontological elements, and keywords that are related to keywords in the corpus of metadata. As noted above, externally-available information could be identified from a corpus of crowdsourced information. In specific examples, the discovery tool uses process mining and deep log inspection against the corpus of metadata as part of the orienting.

The orienting can therefore acquire ontological element(s) from externally-available information, and augment the corpus of metadata with the ontological element(s), the idea being to augment the corpus to more fully flesh-out the meaning and context of what is reflected by the metadata collected from the devices.

The generating (204) and orienting (206) can serve not only as a setup to additional aspects described below, but can also be performed in an ongoing manner over time to periodically or aperiodically refresh and augment the corpus of metadata and the ontological elements to which that metadata, old and new, orients. In this manner, the process can refine its understanding of the user's continually-evolving familiarity with various assets, devices, applications, technical information, and so on based on how the user interacts with these items over time.

Continuing with FIG. 2, the process monitors (208), for instance via software executing on a device used by the user, user consumption of digital content on the device, and identifies content elements of the digital content. User consumption in this context includes loading the digital content for graphical presentation to the user. The process compares (210) the identified content elements to the ontological elements to which the metadata is oriented, and identifies, based on this comparing, a target content element, of the identified content elements, to contextualize for the user with selected metadata of the corpus. In this aspect, the process monitors content that the user is consuming in order to see where to leverage a contextualization action to modify the digital content (212). Part of this is identification of content element(s) found in the digital content being consumed, or at least loaded for consumption, and comparing that to ontological element(s) to which the metadata was oriented. From that comparison, a target content element to contextualize is identified. The target content element could be, for instance, a word, phrase, paragraph, image/picture, video, or other digital content element that is identified as being something (keyword, specification, ontology, feature, capability, etc.) about which the user could benefit from additional contextualization. It could be a technical detail that the process believes is not fully understood or appreciated by the user, for instance.

User consumption of content could be effected in any of a variety of ways. In some examples, the monitoring of the user consumption could include the software performing monitoring of webpage data loaded for display in a browser of the device to identify the content elements, and/or performing screen scraping against a display of the device. In this manner, page processing, screen processing, or other processing of data on-screen or that the user is interacting with can be monitored to identify content elements as candidates for contextualization. In an example embodiment, a machine-learning-based artificial intelligence (AI) model, for instance implemented via a convolutional neural network, can capture the content elements of the digital content that the user is consuming and compare this against a known expertise, comfort level, and/or contextual level of the user, in terms of what the model knows or is indicated/assumed to be familiar with. Comparison content elements can be extracted based on text, image, or other processing of the digital content. The AI model can be trained to classify a level of contextual sense that content elements are expected to make to the user, and a content element targeted for contextualization can be one that the AI model classifies as a low likelihood of making contextual sense to the user. The comparing and identifying (210) may be performed by the AI model. The AI model could be trained on training data from any appropriate dataset. In some examples, the model is trained from the corpus of metadata itself (generated at 204, optionally also oriented by 206). Additionally or alternatively, the model is trained from another, predefined corpus of information that is indicative of the user's contextual understanding of technical domains. For instance, the user could specify, or the process could build, a pre-specified dataset of items for which there is a low likelihood of user understanding.

With a target content element identified, this may be compared by crawling the oriented metadata corpus to identify associated products or other ontological elements. This is the start of bridging the target content element to a contextual understanding for the user that enables the user to better understand the target content element, for instance through a comparative metric, feature, characteristics, or the like from the corpus generated and oriented previously. The identified ontological elements can then be leveraged in modifying (replacing, augmenting, supplementing, etc.) the digital content (212), for instance the initial target content element.

Figure 3A:
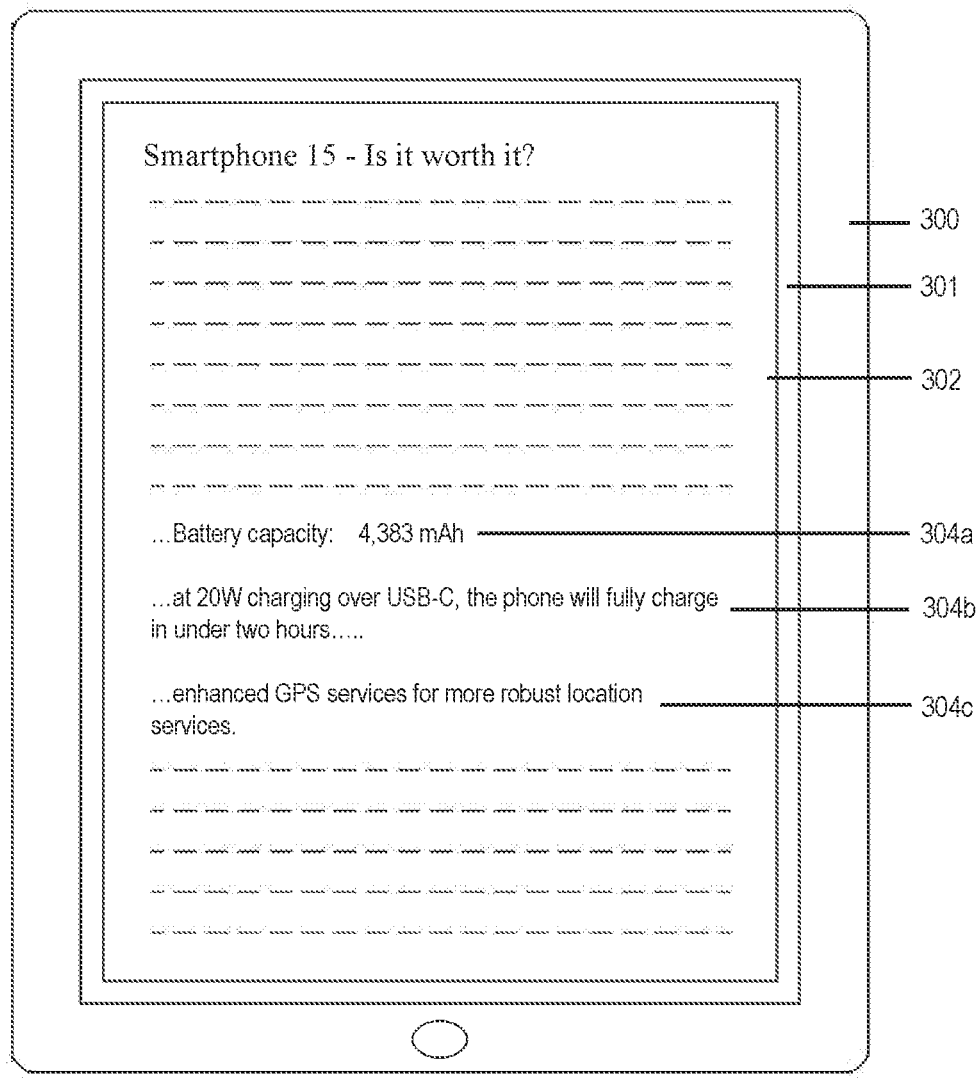
FIGS. 3A-3E depict examples of modifying digital content for graphical presentation to a user, in accordance with aspects described herein.

To help illustrate aspects of content contextualization, FIGS. 3A-3E depict examples of modifying digital content for graphical presentation to a user, in accordance with aspects described herein. The modifications are made in these examples to digital content—an article in this example—presented on an interface of an electronic device 300, which is a tablet mobile device in this example. Referring initially to FIG. 3A, electronic device 300 includes a physical display 301 showing article 302, entitled "Smartphone 15—Is it worth it?", on the display interface of the device. The article includes various content elements, for instance text and/or graphics. Three content elements—304a, 304b, and 304c—are shown in FIG. 3A, and these are candidates for potential contextualization.

A process can compare these identified content elements to the ontological elements to which the metadata is oriented, and identify, based on the comparing, a target content element, of the identified content elements, to contextualize for the user with selected metadata of the corpus. For instance, the process might identify that the article provides, via these content elements, specifications as to battery capacity, charging (wattage, connector type, duration), and GPS capability, and compare these elements to elements to which the metadata is oriented. The metadata might also have specifications as to battery, charging, and GPS capabilities of the user's current and old smartphones, for instance, ontologically related to these elements. The relevant metadata may be a subset/collection of the larger corpus. The process might then identify one (or more) of items 304a, 304b, 304c to contextualize, and select appropriate metadata from that collection of metadata ontologically related to the content element(s) targeted for contextualization. There might be multiple possibilities as to which metadata to use for the contextualization. For instance, the metadata might identify battery capacity of the user's current smartphone and prior smartphone. It might be preferred to contextualize the stated battery capacity in the article (4,383 mAh) with the battery capacity of the user's current smartphone. A comparison to a more recently used device and/or closer model smartphone may be preferred in this example, and in this manner, any desired ranking or filtering approach may be used to identify the "best" information/metadata to use. Thus, the selected metadata to use may be derived from, or about, a device of the devices associated with the user, and the selection of this metadata may be based on recency of use of the device. Something the user was familiar with 15 years ago may not be as useful as a comparable piece of information from 2 months ago, for instance. Additionally or alternatively, the selection of this metadata may be based on relevancy of the selected metadata to the target content element as informed by comparability between a technical specification or description of the device and a technical specification or description provided in the digital content about a product. If it is desired to contextualize battery life of a 4,383 mAh battery, a comparison with the battery life of a tablet device with a similar size battery is likely to be much more helpful to the user than a comparison with the battery life of rechargeable wireless headphones, which have a much smaller battery capacity and different energy consumption profile than that of a smartphone.

With the target content element(s) for contextualization identified, the process modifies the digital content for graphical presentation to the user. Modifying provides, for instance, added information, associated with a target content element, in the digital content, where the added information includes selected metadata of the corpus. 'Added information' in this context refers to the presence of some information that was not in the original digital content, and that is associated with a target content element. The modifying could modify, delete, replace, augment, supplement, etc. the target content element. In examples, the added information provides a comparison between the target content element and selected metadata. The comparison can be extracted based on the metadata, built, and applied to the non-contextually infused target content element, and presented to the user.

Figure 3B:
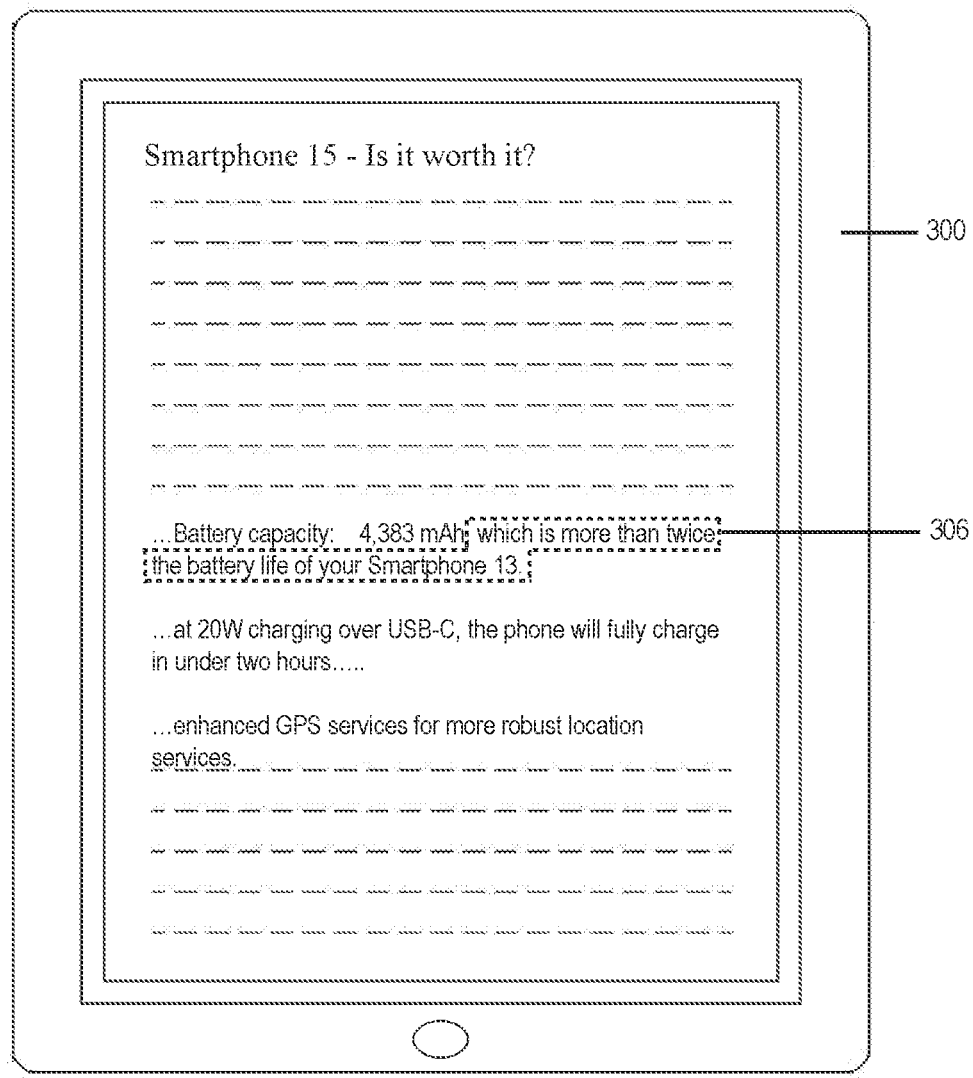

FIG. 3B depicts an example modification of the digital content of FIG. 3A for graphical presentation to the user. In this example, the target content element is element 304a of FIG. 3A, and the content element has been augmented with added information 306 to indicate that the 4,383 mAh battery capacity of the Smartphone 15 being discussed in the article provides more than double the battery life (as indicated by capacity) of the user's current smartphone, the Smartphone 13, by the same device manufacturer. For instance, the metadata might have indicated that Smartphone 13 has a battery capacity of 2,160 mAh and that the user's previous smartphone (version 12) has a battery capacity of 2,200 mAh. The comparison to Smartphone 13 and the battery capacity thereof may have been selected pursuant to the approach discussed previously that uses recency/relevancy to identify that a comparison to the Smartphone 13 is better for contextualization than a comparison to the Smartphone 12. It is seen that the target content element can include a technical specification or description of a product, and the selected metadata includes a metrically-comparable technical specification or description of a device of the devices associated with the user (in this example the fact that the Smartphone 13 has less than half the capacity of the Smartphone 15). Though in this example the numerical battery capacity of the Smartphone 13 is not provided, it could have been if desired.

Figure 3C:
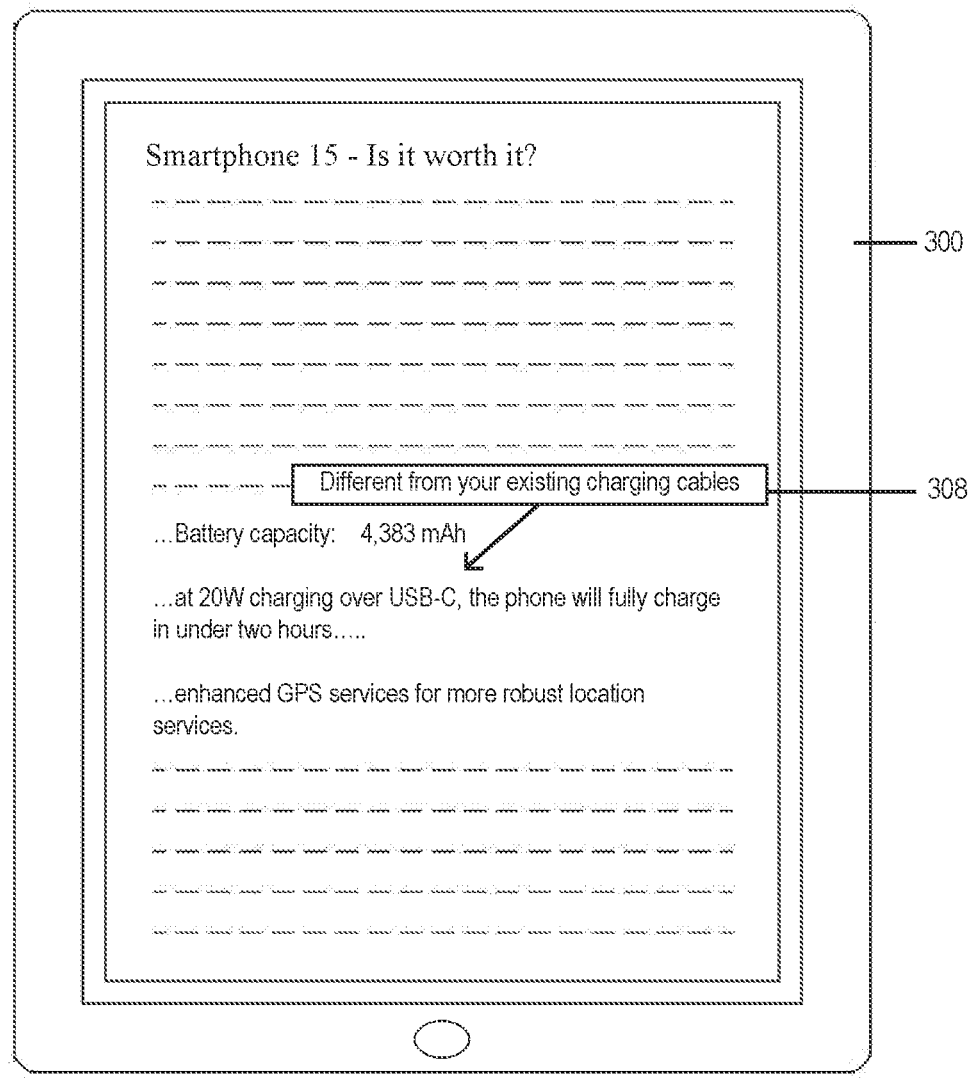

FIG. 3C depicts an example modification of the digital content of FIG. 3A for graphical presentation to the user. In this example, the target content element is element 304b of FIG. 3A, and the content element has been augmented with added information in the form of a popout/overlay 308 indicating that the wired charging connector type (USB-C) of the Smartphone 15 is a different connector type than that of the user's existing charging cables. Here, the metadata indicates that the user uses a Smartphone 13 and that the connector type of the Smartphone 13 uses another type of connector, different from the USB-C connector type. The process might determine that contextualization of this element might be helpful. For instance, it might determine, based on what is indicated by the metadata, that the user does not currently use any device with a USB-C connector but that the user charges at least the Smartphone 13 via a cable of the different connector type. The process therefore provides information via 308 indicating to the user that different charging cable(s), i.e., with the USB-C connector type, will be needed. It also contextualizes for the user that USB-C relates to hardware (cable) for charging the phone.

Figure 3D:
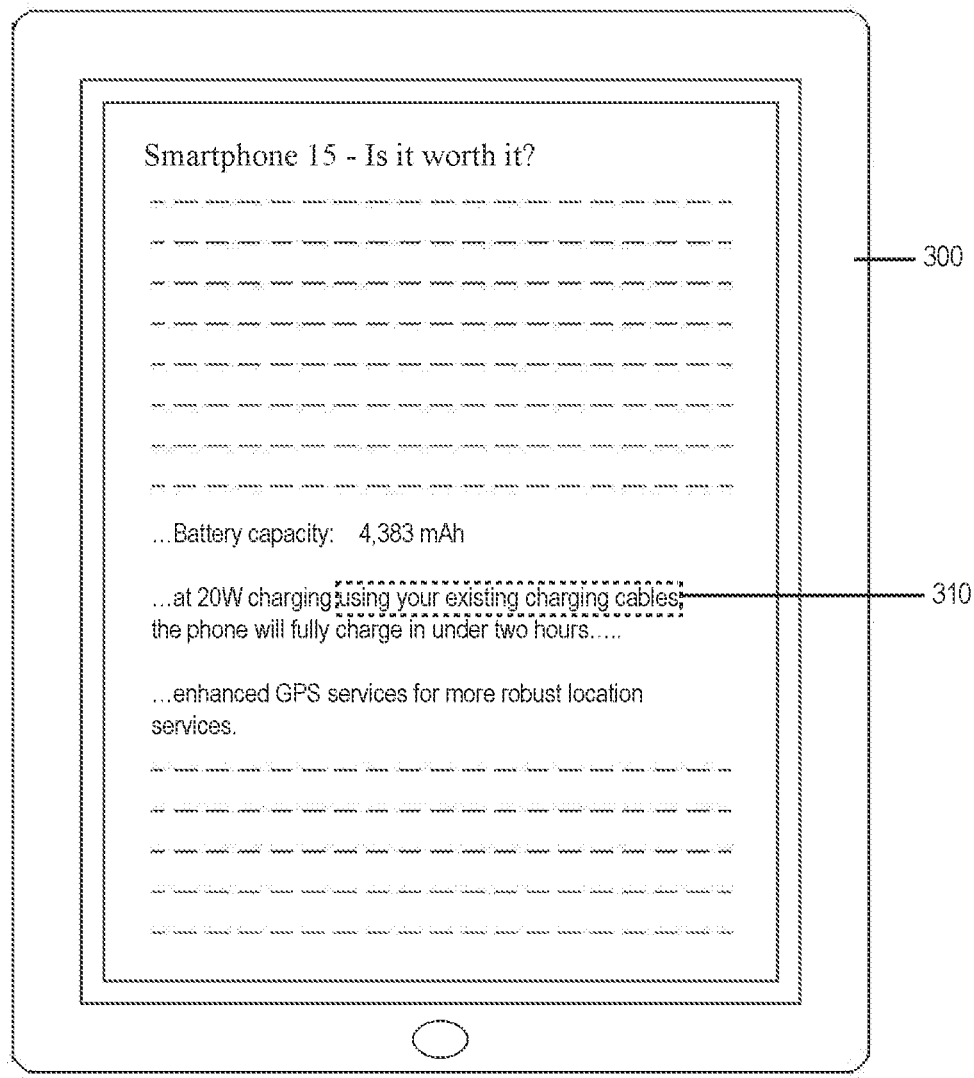

FIG. 3D depicts another example modification of the digital content of FIG. 3A for graphical presentation to the user. The target content element is element 304b of FIG. 3A in this example as well, and it is determined that the Smartphone 15 uses the same connector type as the user's current Smartphone. Here, information 310 has replaced some content, specifically the text "over USB-C", to indicate for the user that the user will be able to use the user's existing charging cables. This could be done if the process determines that the user may be unfamiliar with the fact that the user currently uses USB-C cables for charging but is unaware of connector type terminology.

Figure 3E:
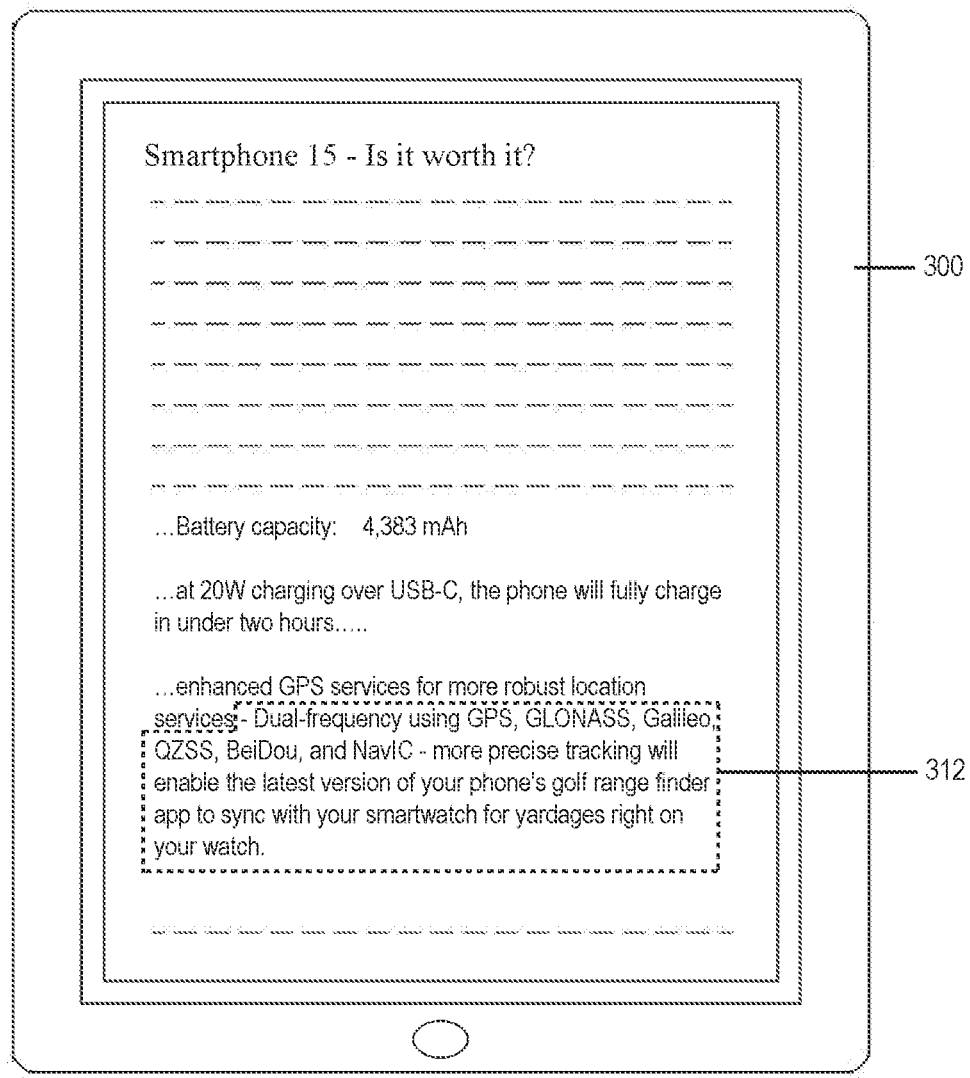

FIG. 3E depicts yet another example modification of the digital content of FIG. 3A for graphical presentation to the user. Here, the process extends meta information based on application use and interactions of the user. The target content element in this example is element 304c, providing a technical specification or description of the product. The process augments the digital content with information 312 about additional features/optimizations of an application that the user currently executes on a device, and specifically a feature/optimization afforded by execution of the application on the product (Smartphone 15) discussed in the digital content in comparison to execution on other device(s) associated with the user. This may be done in situations where the product discussed in the article has more processing power, an additional sensor, enhanced GPS capability, or other features such that the user's experience with application(s) might be improved in terms of a feature set. Here, the digital content is modified to specifically indicate some enhanced GPS functionality of the Smartphone 15—that is operates in dual-frequency with capabilities for GPS, GLONASS, Galileo, QZSS, BeiDou, and NavIC. Further, the process determines, possibly based on information from external sources discussing feature sets of applications, that this enhanced GPS functionality will enable the user to use on the Smartphone 15 the latest version of a particular golf range finder application that the user currently uses on the user's Smartphone 13. In addition, the process identifies that this latest version of the app supports smartwatch synchronization functionality, which would enable the user to sync the user's smartwatch companion application to the application on the smartphone to provide distance yardages on the user's smartwatch. In this manner, the process identifies that the enhanced GPS capability of the new product is not provided by the user's current device(s) and will therefore open up this specific, additional feature of the application to the user.

In addition, the process can automatically track user interaction with added information. For instance, the added information could include interactive elements, such as hyperlinks, buttons, or the like, which the user can interact with. The elements might lead the user to additional information like articles or technical specifications from external sources, and/or metadata or ontological elements that informed the modification to provides the contextualization. For instance, the user might click on item 306 in FIG. 3B to view the metadata, for instance the technical specification as to the battery capacity of the Smartphone 13, that informed the added information. Similarly, selecting item 312 of FIG. 3E might display the name of the golf range finder application and include a hyperlink that navigates the user to the website or appstore listing for the application that discusses features of the latest version of the application.

The process can use the data gathered from automatic tracking user interactions as training data for further training AI models. One such model is the AI model that classifies a level of contextual sense that content elements are expected to make to the user. In examples, the tracking tracks clickthrough as success (or failure) factors. This can help train on not only what content elements to contextualize but also what works best in terms of what to provide as added information.

One example use case for aspects described herein is a situation in which a user is looking to purchase a new laptop and is overwhelmed by a large number of technical specifications and jargon used to describe different available models in digital content she is viewing. Aspects can help the user understand what the user should look for in a laptop. Thus, aspects use the user's device information, including information from/about the user's current laptop, as gathered in the metadata corpus, and compares this to specifications of laptop(s) about which the user is consuming digital content, for instance in the form of product webpages, reviews, articles, emails, etc. Aspects then contextualize some technical specifications and details of a laptop the user is reading about by replacing some non-contextualized information with relative information derived from the metadata and ontological elements oriented to that. Which information to use may be based on the recency of the user's current laptop, for example. Additionally, aspects can provide relevancy flags (for instance flags about which elements may or may not be particularly relevant to the user's use case, as informed by the metadata) that allow the user to better understand the specifications and details of the laptop being viewed for potential purchase.

Another example use cases is one in which a user is looking to purchase a new smartphone but is unsure of what to look for in terms of functionality and specifications. Aspects described herein can use information about the user's current device information, which includes a current smartphone, crawl through an AI-discovered corpus of information and ontological elements pertaining to content elements in digital content being consumed by the user about a new smartphone, and compare this against the user's known expertise, comfort level, and contextual level of understanding about these elements as informed by the corpus of metadata and ontological elements to which it is oriented. The module could highlight associated products or products in a relevant ontology that are also found within the AI-discovered corpus. Aspects can also find a comparative metric in the user corpus and replace non-contextualized information with the comparative metric. Relevancy flags can be provided in digital content bring consumed that allow the user to better understand the specifications and details of the smartphone being discussed.

It is also noted that in generating the corpus of metadata associated with a user, the devices associated with the user may or may not be devices that the user uses; they could instead be devices used by others but that are provided, monitored, controlled, serviced (or otherwise) by the user. Consider yet another use case in which the user is a provider of software for a company. The user is looking to find the best product to provide for other individuals at the company. There may be many options. Aspects described herein can assist the user in identifying a desired one of those. Thus, aspects use the device information of the devices associated with this user but used by the other individuals, which information can reflect usage characteristics and other information about those other individuals, and leverage aspects described herein for comparison to specifications of the products being explored as options. Aspects contextualize the technical specifications and details of the products being explored by the user in the form of digital content that the user consumes. For instance, non-contextualized information is replaced with relative information, for instance based on the recency of devices and use by the company individuals using the current devices. The user, with perhaps just a very limited understanding of the software products being investigated, may use this added information to better understand the current specifications and required details of the products that the user might recommend to the other individuals of the company.

Additional capabilities are enabled by aspects described herein. The contextualization can help tailor content to the user's level of knowledge and understanding, allowing for easier comprehension and more meaningful interactions with the digital content being consumed. A user's age, grade level, cognitive characteristics, and other characteristics can inform this tailoring. Additionally, these characteristics might change over time, and therefore aspects described herein can also adapt to match the user's changing level of understanding. Aspects can also be used to help create certain association activities and exercises owing to the associations made between target content elements and the added content.

It is also noted that digital content can incorporate pictures, videos, and/or other graphical elements that may be contextualized with added information. For example, aspects might recognize and contextualize images via image recognition, allowing for more comprehensive understanding of the visuals, aids, artwork, etc. provided in digital content.

Figure 4:
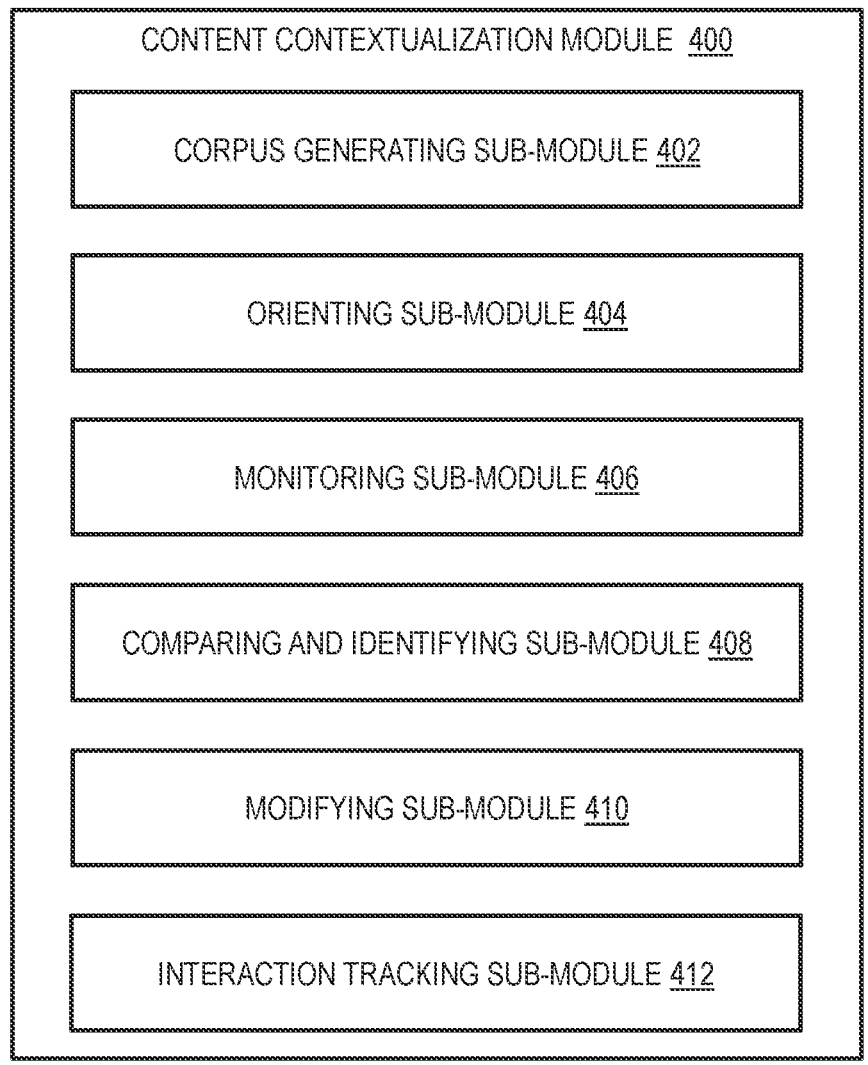
FIG. 4 depicts further details of an example content contextualization module to incorporate and/or use aspects described herein.

Accordingly, FIG. 4 depicts further details of an example content contextualization module (e.g., content contextualization module 400 of FIG. 1) to incorporate and/or use aspects described herein. In one or more aspects, content contextualization module 400) includes, in one example, various sub-modules to be used to perform content contextualization. The sub-modules can be or include, e.g., computer readable program code (e.g., instructions) in computer readable media, e.g., persistent storage (e.g., persistent storage 113, such as a disk) and/or a cache (e.g., cache 121), as examples. The computer readable media may be part of a computer program product and may be executed by and/or using one or more computers or devices, and/or processor(s) or processing circuitry thereof, such as computer(s) 101, EUD 103, server 104, or computers of cloud 105/106 of FIG. 1, as examples.

Figure 5:
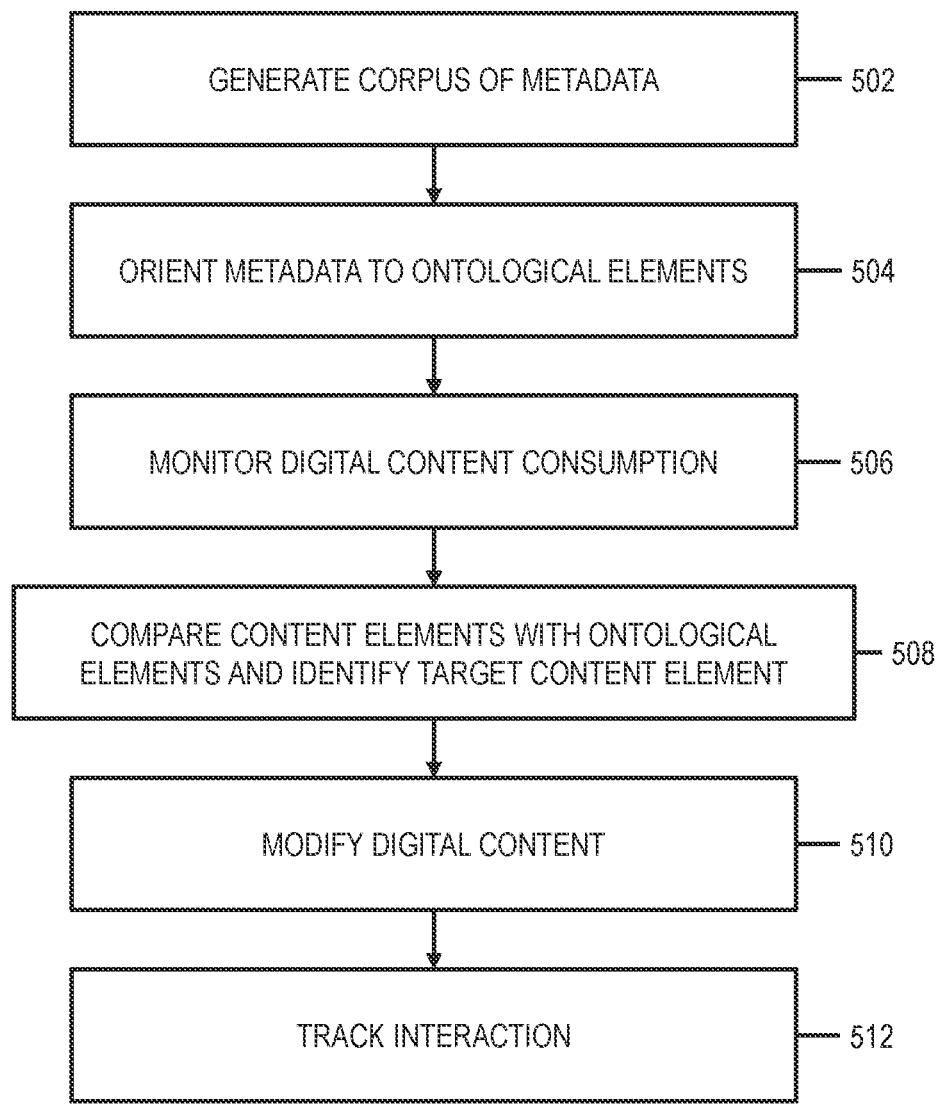
FIG. 5 depicts an example process for contextualization of digital content, in accordance with aspects described herein.

FIG. 5 depicts an example process for contextualization of digital content, in accordance with aspects described herein. The process may be executed, in one or more examples, by a processor or processing circuitry of one or more computers/computer systems, such as those described herein, and more specifically those described with reference to FIG. 1. In one example, code or instructions implementing the process(es) of FIG. 5 are part of a module, such as module 400. In other examples, the code may be included in one or more modules and/or in one or more sub-modules of the one or more modules. Various options are available.

With dual reference to FIGS. 4 and 5, the process of FIG. 5 begins by generating (502), for instance by corpus generating sub-module 402, a corpus of metadata associated with a user. The metadata includes technical information about devices associated with the user and applications that execute on the devices, and interaction data describing usage of devices and applications that execute on the devices. The process continues by orienting (504), for instance by orienting sub-module 404, the metadata to ontological elements, including keywords and concepts. The orienting includes relating items of the metadata to externally-available information to identify at least some of the ontological elements. In embodiments, the orienting uses a discovery tool to perform the relating, where the discovery tool searches for externally-available commercial data, ontological elements, and keywords that are related to keywords in the corpus of metadata. In further embodiments, the discovery tool uses process mining and deep log inspection against the corpus of metadata as part of the orienting.

The orienting can acquire an ontological element, of the at least some of the ontological elements, from the externally-available information, and augment the corpus with the ontological element, as an example. The externally-available information could include or be from a corpus of crowdsourced information.

By way of specific example, the ontological element includes technical specification(s) of one or more devices.

Continuing with FIG. 5, the process monitors (506), by software executing on a device used by the user, for example by monitoring sub-module 406, user consumption of digital content on the device and identifies content elements of the digital content. The user consumption includes loading the digital content for graphical presentation to the user. In embodiments, the monitoring includes the software performing (i) monitoring webpage data loaded for display in a browser of the device to identify the content elements, and/or (ii) screen scraping against a display of the device.

The process then, for instance by way of the comparing and identifying sub-module 408, compares (508) the identified content elements to the ontological elements to which the metadata is oriented, and identifies, based on the comparing, a target content element, of the identified content elements, to contextualize for the user with selected metadata of the corpus. In embodiments, the comparing and identifying is performed by an artificial intelligence (AI) model trained to classify a level of contextual sense that content elements are expected to make to the user. The AI model could be trained on training data from the corpus of metadata, and/or another predefined corpus of information indicative of the user's contextual understanding of technical domains, as examples. The process can select the selected metadata from a collection of metadata, of the corpus, that is ontologically related to the target content element. In examples, the selected metadata is derived from, or about, a device of the devices associated with the user, and the selection of the selected metadata is based on (i) recency of use of the device, and/or (ii) relevancy of the selected metadata to the target content element as informed by comparability between a technical specification or description of the device and a technical specification or description provided in the digital content about a product.

The process continues by modifying (510), for instance by the modifying sub-module 410, the digital content for graphical presentation to the user. The modifying provides added information, associated with the target content element, in the digital content, the added information including the selected metadata of the corpus. In embodiments, the added information provides a comparison between the target content element and the selected metadata. In embodiments, the target content element includes a technical specification or description of a product, and the selected metadata includes a metrically-comparable technical specification or description of a device of the devices associated with the user.

The target content element could include, as an example, a technical specification or description of a product, and the method could further augment the digital content with information about additional features or optimizations of an application, of the applications that execute on the devices, afforded by execution of the application on the product in comparison to execution of the application on at least one of the devices associated with the user.

Finally, the process of FIG. 5 automatically tracks (512), for instance by interaction tracking sub-module 412, user interaction with the added information, and uses the automatically tracked user interaction for further training the AI model.

Although various embodiments are described above, these are only examples.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
generating a corpus of metadata associated with a user, the metadata including technical information about devices associated with the user and applications that execute on the devices, and interaction data describing usage of the devices and applications that execute on the devices;
orienting the metadata to ontological elements, including keywords and concepts, the orienting comprising relating items of the metadata to externally-available information to identify at least some of the ontological elements;
monitoring, by software executing on a device used by the user, user consumption of digital content on the device and identifying content elements of the digital content, the user consumption including loading the digital content for graphical presentation to the user;
comparing the identified content elements to the ontological elements to which the metadata is oriented, and identifying, based on the comparing, a target content element, of the identified content elements, to contextualize for the user with selected metadata of the corpus; and
modifying the digital content for graphical presentation to the user, the modifying providing added information, associated with the target content element, in the digital content, the added information including the selected metadata of the corpus.

2. The method of claim 1, wherein the orienting uses a discovery tool to perform the relating, the discovery tool searching for externally-available commercial data, ontological elements, and keywords that are related to keywords in the corpus of metadata.

3. The method of claim 2, wherein the discovery tool uses process mining and deep log inspection against the corpus of metadata as part of the orienting.

4. The method of claim 1, wherein the orienting acquires an ontological element of the at least some of the ontological elements from the externally-available information, and augments the corpus with the ontological element.

5. The method of claim 4, wherein the ontological element comprises technical specifications of one or more devices.

6. The method of claim 1, wherein the externally-available information comprises a corpus of crowdsourced information.

7. The method of claim 1, wherein the added information provides a comparison between the target content element and the selected metadata.

8. The method of claim 7, wherein the target content element comprises a technical specification or description of a product, and wherein the selected metadata comprises a metrically-comparable technical specification or description of a device of the devices associated with the user.

9. The method of claim 1, further comprising selecting the selected metadata from a collection of metadata, the collection of metadata being metadata, of the corpus, ontologically related to the target content element.

10. The method of claim 9, wherein the selected metadata is derived from, or about, a device of the devices associated with the user, and wherein the selecting the selected metadata is based on at least one selected from the group consisting of:
(i) recency of use of the device; and
(ii) relevancy of the selected metadata to the target content element as informed by comparability between a technical specification or description of the device and a technical specification or description provided in the digital content about a product.

11. The method of claim 1, wherein the comparing and identifying is performed by an artificial intelligence (AI) model trained to classify a level of contextual sense that content elements are expected to make to the user.

12. The method of claim 11, wherein the AI model is trained on training data from at least one selected from the group consisting of:
the corpus of metadata; and
another predefined corpus of information indicative of the user's contextual understanding of technical domains.

13. The method of claim 11, further comprising automatically tracking user interaction with the added information, and using the automatically tracked user interaction for further training the AI model.

14. The method of claim 1, wherein the monitoring comprises the software performing at least one selected from the group consisting of: (i) monitoring webpage data loaded for display in a browser of the device to identify the content elements; and (ii) screen scraping against a display of the device.

15. The method of claim 1, wherein the target content element comprises a technical specification or description of a product, and wherein the method further comprises augmenting the digital content with information about additional features or optimizations of an application, of the applications that execute on the devices, afforded by execution of the application on the product in comparison to execution of the application on at least one of the devices associated with the user.

16. A computer system comprising:
a memory; and
a processor in communication with the memory, wherein the computer system is configured to perform a method comprising:
generating a corpus of metadata associated with a user, the metadata including technical information about devices associated with the user and applications that execute on the devices, and interaction data describing usage of devices and applications that execute on the devices;
orienting the metadata to ontological elements, including keywords and concepts, the orienting comprising relating items of the metadata to externally-available information to identify at least some of the ontological elements;
monitoring, by software executing on a device used by the user, user consumption of digital content on the device and identifying content elements of the digital content, the user consumption including loading the digital content for graphical presentation to the user;
comparing the identified content elements to the ontological elements to which the metadata is oriented, and identifying, based on the comparing, a target content element, of the identified content elements, to contextualize for the user with selected metadata of the corpus; and modifying the digital content for graphical presentation to the user, the modifying providing added information, associated with the target content element, in the digital content, the added information including the selected metadata of the corpus.

17. The computer system of claim 16, wherein the added information provides a comparison between the target content element and the selected metadata, wherein the target content element comprises a technical specification or description of a product, and wherein the selected metadata comprises a metrically-comparable technical specification or description of a device of the devices associated with the user.

18. The computer system of claim 16, wherein the method further comprises selecting the selected metadata from a collection of metadata, the collection of metadata being metadata, of the corpus, ontologically related to the target content element, wherein the selected metadata is derived from, or about, a device of the devices associated with the user, and wherein the selecting the selected metadata is based on at least one selected from the group consisting of:
  (i) recency of use of the device; and
  (ii) relevancy of the selected metadata to the target content element as informed by comparability between a technical specification or description of the device and a technical specification or description provided in the digital content about a product.

19. A computer program product comprising:
  a computer readable storage medium readable by a processing circuit and storing instructions for execution by the processing circuit to:
    generating a corpus of metadata associated with a user, the metadata including technical information about devices associated with the user and applications that execute on the devices, and interaction data describing usage of devices and applications that execute on the devices;
    orienting the metadata to ontological elements, including keywords and concepts, the orienting comprising relating items of the metadata to externally-available information to identify at least some of the ontological elements;
    monitoring, by software executing on a device used by the user, user consumption of digital content on the device and identifying content elements of the digital content, the user consumption including loading the digital content for graphical presentation to the user;
    comparing the identified content elements to the ontological elements to which the metadata is oriented, and identifying, based on the comparing, a target content element, of the identified content elements, to contextualize for the user with selected metadata of the corpus; and
    modifying the digital content for graphical presentation to the user, the modifying providing added information, associated with the target content element, in the digital content, the added information including the selected metadata of the corpus.

20. The computer program product of claim 19, wherein the added information provides a comparison between the target content element and the selected metadata, wherein the target content element comprises a technical specification or description of a product, and wherein the selected metadata comprises a metrically-comparable technical specification or description of a device of the devices associated with the user.

* * * * *